United States Patent
Kagara

(10) Patent No.: US 10,715,621 B2
(45) Date of Patent: Jul. 14, 2020

(54) COMMUNICATION METHOD, IN-VEHICLE COMMUNICATION DEVICE, COMPUTER-READABLE MEDIUM, AND IN-VEHICLE COMMUNICATION SYSTEM

(71) Applicant: TOYOTA JIDOSHA KABUSHIKI KAISHA, Toyota-shi, Aichi-ken (JP)

(72) Inventor: Fumiyuki Kagara, Sagamihara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/179,844

(22) Filed: Nov. 2, 2018

(65) Prior Publication Data

US 2019/0141159 A1    May 9, 2019

(30) Foreign Application Priority Data

Nov. 8, 2017    (JP) ................................ 2017-215608

(51) Int. Cl.

| | | |
|---|---|---|
| *H04W 4/48* | (2018.01) | |
| *H04W 88/04* | (2009.01) | |
| *H04L 29/08* | (2006.01) | |
| *H04W 76/18* | (2018.01) | |
| *H04W 4/44* | (2018.01) | |
| *H04W 88/06* | (2009.01) | |

(52) U.S. Cl.
CPC ........... *H04L 67/2842* (2013.01); *H04W 4/44* (2018.02); *H04W 4/48* (2018.02); *H04W 76/18* (2018.02); *H04W 88/04* (2013.01); *H04W 88/06* (2013.01)

(58) Field of Classification Search
CPC ...... H04L 67/2842; H04W 4/48; H04W 4/44; H04W 76/18; H04W 88/06; H04W 88/04
See application file for complete search history.

(56) References Cited

U.S. PATENT DOCUMENTS

| | | | |
|---|---|---|---|
| 10,419,519 B2* | 9/2019 | Yamamura | H04L 67/06 |
| 2004/0005882 A1* | 1/2004 | Yoshii | H04W 88/085 |
| | | | 455/422.1 |
| 2015/0296019 A1* | 10/2015 | Onishi | H04W 12/06 |
| | | | 709/228 |

FOREIGN PATENT DOCUMENTS

JP    2013-005151 A    1/2013

* cited by examiner

*Primary Examiner* — Mohamed A Kamara
(74) *Attorney, Agent, or Firm* — Hunton Andrews Kurth LLP

(57) ABSTRACT

There is provided a communication method in which an in-vehicle communication device transmits data to a server. The communication method includes: transmitting the data from the in-vehicle communication device to the server when a first communication link between the in-vehicle communication device and the server is established; transmitting the data from the in-vehicle communication device to a relay device different from the server when the first communication link is not established; temporarily storing the data received from the in-vehicle communication device in the relay device when a third communication link between the relay device and the server is not established; and transmitting the temporarily stored data from the relay device to the server through the third communication link when the third communication link is established and the temporarily stored data is present in the relay device.

6 Claims, 3 Drawing Sheets

COMMUNICATION METHOD, IN-VEHICLE COMMUNICATION DEVICE, COMPUTER-READABLE MEDIUM, AND IN-VEHICLE COMMUNICATION SYSTEM

INCORPORATION BY REFERENCE

The disclosure of Japanese Patent Application No. 2017-215608 filed on Nov. 8, 2017 including the specification, drawings and abstract is incorporated herein by reference in its entirety.

BACKGROUND

1. Technical Field

The disclosure relates to a communication method, an in-vehicle communication device, a computer-readable medium, and an in-vehicle communication system.

2. Description of Related Art

Japanese Unexamined Patent Application Publication No. 2013-005151 (JP 2013-005151 A) has proposed a technique for determining whether a car navigation device itself becomes an executing entity that communicates with a communication center or a portable terminal becomes the executing entity that communicates with the communication center from the viewpoint of a communication speed, a communication fee, or the like, in response to a request from an application. In a case where the car navigation device becomes the executing entity that communicates with the communication center, the car navigation device transfers a communication request to a communication processing execution unit in the car navigation device itself. In a case where the portable terminal becomes the executing entity that communicates with the communication center, the car navigation device transfers the communication request to the portable terminal.

SUMMARY

However, in the technique disclosed in JP 2013-005151 A, when communication is interrupted for some reason while the car navigation device is executing communication processing with the communication center as the executing entity of the communication processing, the portable terminal cannot take over the communication with the communication center. In the above case, the portable terminal that can take over the communication with the communication center is particularly useful in a single sign-on system or the like in which data synchronization is needed.

The disclosure provides a communication method useful for data synchronization.

A first aspect of the disclosure relates to a communication method in which an in-vehicle communication device transmits data to a server. The communication method includes: transmitting the data from the in-vehicle communication device to the server through a first communication link when the first communication link between the in-vehicle communication device and the server is established; transmitting the data from the in-vehicle communication device to a relay device different from the server through a second communication link different from the first communication link when the first communication link is not established; temporarily storing the data received from the in-vehicle communication device in the relay device when a third communication link between the relay device and the server is not established; and transmitting the temporarily stored data from the relay device to the server through the third communication link when the third communication link is established and the temporarily stored data is present in the relay device.

In the communication method according to the first aspect of the disclosure, the relay device may be a mobile communication terminal that performs mobile communication with the server.

The communication method according to the first aspect of the disclosure may further include determining whether or not the data received by the server from the in-vehicle communication device includes unreceived data, which is data that has not been received by the relay device from the in-vehicle communication device, and transmitting the unreceived data from the server to the relay device when the unreceived data is present and the third communication link is established.

A second aspect of the disclosure relates to an in-vehicle communication device that transmits data to a server. The in-vehicle communication device includes a transmission unit. The transmission unit is configured to transmit the data to the server through a first communication link when the first communication link between the in-vehicle communication device and the server is established, and transmit the data to a relay device different from the server through a second communication link different from the first communication link when the first communication link is not established. The relay device is configured to temporarily store the data received from the in-vehicle communication device when a third communication link between the relay device and the server is not established. The relay device is configured to transmit the temporarily stored data to the server through the third communication link when the third communication link is established and the temporarily stored data is present in the relay device.

A third aspect of the disclosure relates to a non-transitory computer-readable medium storing a program causing a computer to execute a process. The process includes: transmitting data from an in-vehicle communication device to a server through a first communication link when the first communication link between the in-vehicle communication device and the server is established; and transmitting the data from the in-vehicle communication device to a relay device different from the server through a second communication link different from the first communication link when the first communication link is not established. The process includes: temporarily storing, by the relay device, the data received from the in-vehicle communication device when a third communication link between the relay device and the server is not established, and transmitting, by the relay device, the temporarily stored data to the server through the third communication link when the third communication link is established and the temporarily stored data is present in the relay device.

A fourth aspect of the disclosure relates to an in-vehicle communication system. The in-vehicle communication system includes: an in-vehicle communication device; a server configured to communicate with the in-vehicle communication device; and a relay device configured to communicate with the in-vehicle communication device and the server. The in-vehicle communication device is configured to transmit data to the server through a first communication link when the first communication link between the in-vehicle communication device and the server is established, and transmit the data to the relay device different from the server through a second communication link different from the first communication link when the first communication link is not established. The relay device is configured to temporarily store the data received from the in-vehicle communication device when a third communication link between the relay device and the server is not established, and transmit the temporarily stored data to the server through the third communication link when the third communication link is established and the temporarily stored data is present in the relay device.

The communication method according to the aspects of the disclosure is useful for data synchronization.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
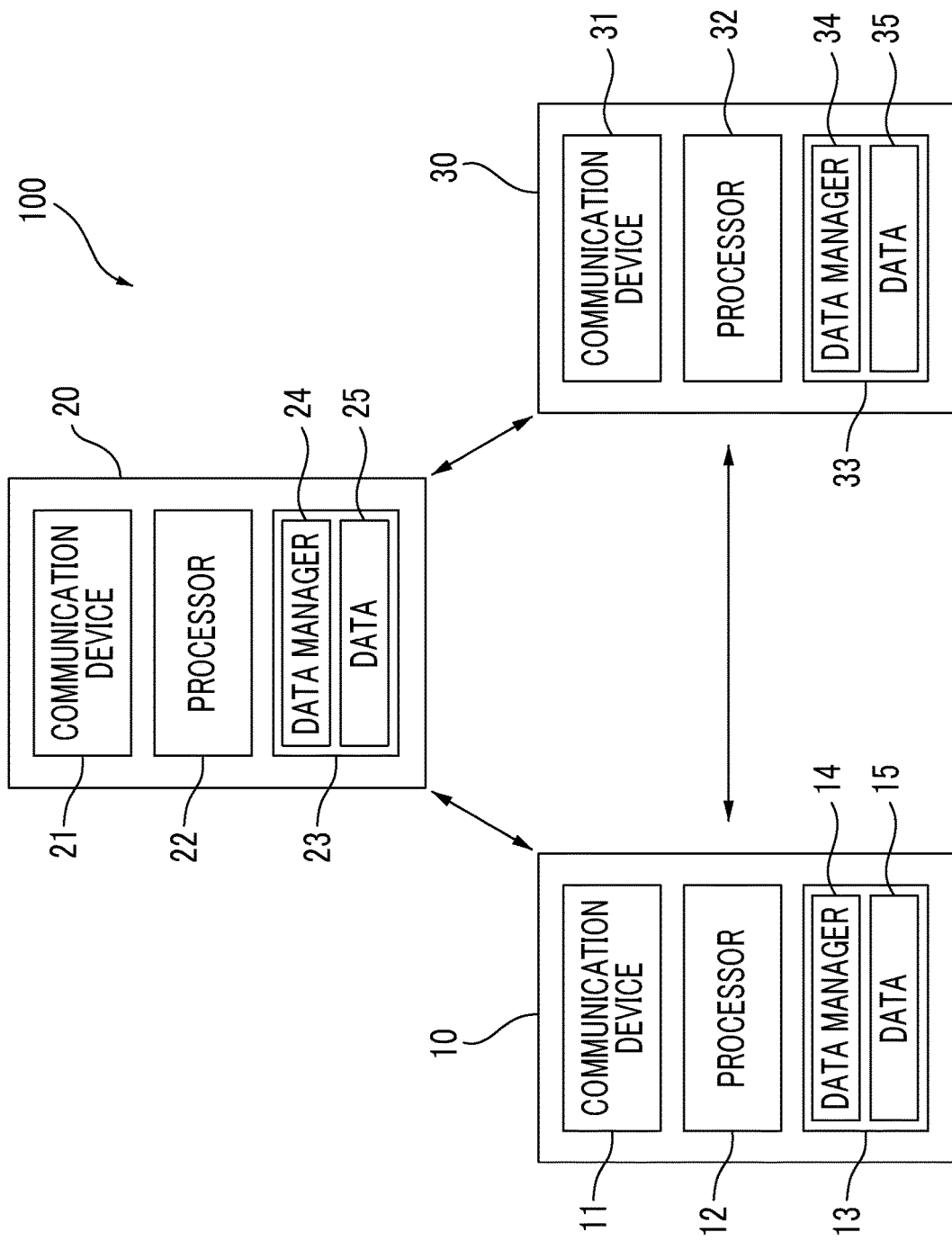
FIG. 1 is a hardware configuration diagram illustrating a schematic configuration of a communication system according to an embodiment of the disclosure.

An embodiment of the disclosure will be described below with reference to the drawings. Here, the same reference numerals denote the same components, and duplicate description thereof will be omitted. FIG. 1 is a hardware configuration diagram illustrating a schematic configuration of a communication system 100 according to the embodiment of the disclosure. The communication system 100 includes three information communication devices 10, 20, 30, and the communication system 100 synchronizes data through communication between the three information communication devices 10, 20, 30 to share the latest data. The information communication devices 10, 20, 30 are computers having a communication function of data communication with each other. At least one of the three information communication devices 10, 20, 30 is capable of mobile communication. In the embodiment, a case where the number of information communication devices constituting the communication system 100 is three is exemplified, but the number of information communication devices constituting the communication system 100 may be four or more.

In the embodiment, a case where the information communication devices 10, 20, 30 are respectively an in-vehicle communication device, a server, and a relay device will be exemplified. Here, the in-vehicle communication device is, for example, a car navigation device that guides a movement route of a vehicle, and is capable of the mobile communication. The server is, for example, a host computer that manages movement records of a plurality of vehicles and that provides traffic information to the vehicles. The relay device is, for example, a mobile communication terminal capable of the mobile communication with the server. The mobile communication terminal is, for example, a portable terminal (for example, a multifunctional mobile phone referred to as a smartphone or a tablet terminal) of an occupant (for example, a driver) of the vehicle. For example, the occupant of the vehicle can receive a service provided by synchronized data from any of the information communication devices 10, 20, 30 through an authentication procedure referred to as single sign-on using identification information and a password associated with the occupant of the vehicle. The communication system 100 may have a function referred to as an agent, for example. The agent can virtually transfer between the information communication devices 10, 20, 30. For example, when the occupant of the vehicle is using the information communication device 30 (for example, manipulating the smartphone), the agent provides a user interface function to the occupant of the vehicle by transferring to the information communication device 30. When the occupant of the vehicle is using the information communication device 10 (for example, manipulating the car navigation device), the agent provides the occupant of the vehicle with the user interface function by transferring to the information communication device 10.

The information communication device 10 includes a communication device 11, a processor 12, and a memory resource 13 as hardware resources. A communication program referred to as a data manager 14 and data 15 scheduled to be synchronized between the information communication devices 10, 20, 30 are stored in the memory resource 13. The data 15 is probe data that carries information (for example, positional information and speed information of the vehicle, and time information) related to the movement record of the vehicle on which the information communication device 10, which is the in-vehicle communication device, is mounted. The data 15 may be, for example, information (for example, information related to a charging amount of an in-vehicle storage battery) indicating states of auxiliary devices of the vehicle on which the information communication device 10, which is the in-vehicle communication device, is mounted. A command for instructing the processor 12 to execute communication processing for synchronizing the data 15 between the information communication devices 10, 20, 30 is described in the data manager 14. The processor 12 transmits the data 15 to the information communication devices 20, 30 through the communication device 11 by interpreting and executing the data manager 14 to synchronize the data 15 between the information communication devices 10, 20, 30. A timing of synchronizing the data 15 may be, for example, set by an interval of a predetermined constant period or a timing at which a predetermined event occurs. In a case where the data 15 is the probe data, it is desirable to share the latest probe data between the information communication devices 10, 20, 30 by synchronizing the data 15 at the interval of the constant period. The communication device 11 is connected to the information communication device 20 through a mobile communication line, for example, and is connected to the information communication device 30 through a short-range wireless communication line (for example, Bluetooth (registered trademark) or Wi-Fi (registered trademark)).

The information communication device 20 includes a communication device 21, a processor 22, and a memory resource 23 as hardware resources. A communication program referred to as a data manager 24 and data 25 scheduled to be synchronized between the information communication devices 10, 20, 30 are stored in the memory resource 23. The data 25 is, for example, traffic information provided from the information communication device 20 which is the server. A command for instructing the processor 22 to execute communication processing for synchronizing the data 25 between the information communication devices 10, 20, 30 is described in the data manager 24. The processor 22 transmits the data 25 to the information communication devices 10, 30 through the communication device 21 by interpreting and executing the data manager 24 to synchronize the data 25 between the information communication devices 10, 20, 30. A timing of synchronizing the data 25 may be, for example, set by an interval of a predetermined constant period or a timing at which a predetermined event occurs. The communication device 21 is connected to the information communication devices 10, 30 through the mobile communication line, for example. The information communication device 20 receives and accumulates the data 15 and data 35 transmitted from the information communication devices 10, 30 respectively and analyzes the data 15, 35 through machine learning, and thus the information communication device 20 can play a role of providing the service to the occupant of the vehicle.

The information communication device 30 includes a communication device 31, a processor 32, and a memory resource 33 as hardware resources. A communication program referred to as a data manager 34 and the data 35 scheduled to be synchronized between the information communication devices 10, 20, 30 are stored in the memory resource 33. The data 35 is, for example, positional information of the information communication device 30. The data 35 may be information (for example, schedule information of the occupant of the vehicle) input from the occupant of the vehicle to an application program installed in the information communication device 30. A command for instructing the processor 32 to execute communication processing for synchronizing the data 35 between the information communication devices 10, 20, 30 is described in the data manager 34. The processor 32 transmits the data 35 to the information communication devices 10, 20 through the communication device 31 by interpreting and executing the data manager 34 to synchronize the data 35 between the information communication devices 10, 20, 30. A timing of synchronizing the data 35 may be, for example, set by an interval of a predetermined constant period or a timing at which a predetermined event occurs. The communication device 31 is connected to the information communication device 10 through the short-range wireless communication line (for example, Bluetooth (registered trademark) or Wi-Fi (registered trademark)), for example, and is connected to the information communication device 20 through the mobile communication line.

The memory resources 13, 23, 33 are storage areas (logical devices) provided by a computer-readable recording medium (a physical device). The computer-readable recording medium is, for example, a storage device such as a semiconductor memory (a volatile memory or a nonvolatile memory) or a disk medium.

Figure 2:
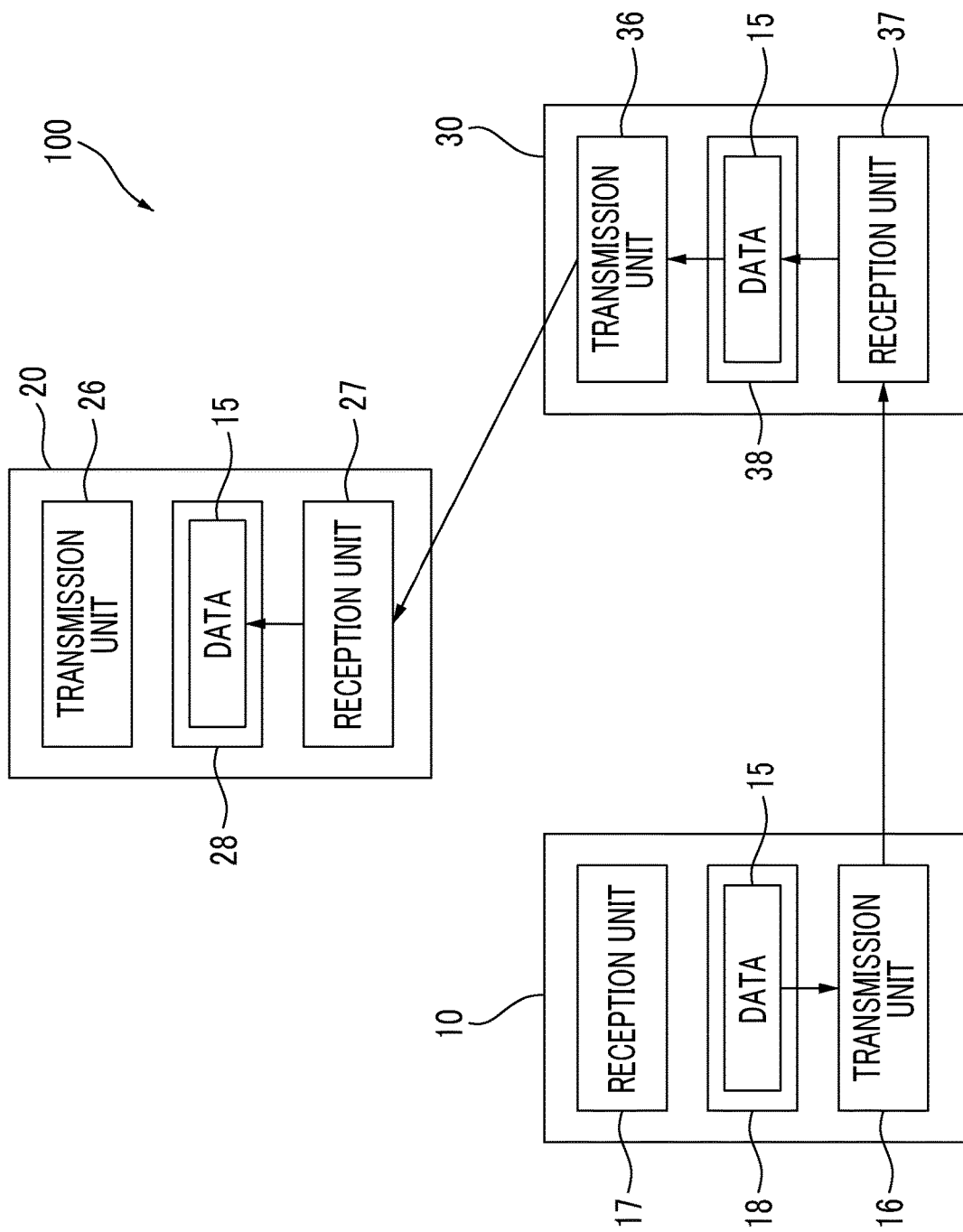
FIG. 2 is a functional block diagram illustrating a schematic configuration of the communication system according to the embodiment of the disclosure.

FIG. 2 is a functional block diagram illustrating a schematic configuration of the communication system 100 according to the embodiment of the disclosure. The information communication device 10 functions as a transmission unit 16, a reception unit 17, and a cache unit 18 by cooperation of the hardware resource and the data manager 14. The information communication device 20 functions as a transmission unit 26, a reception unit 27, and a cache unit 28 by cooperation of the hardware resource and the data manager 24. The information communication device 30 functions as a transmission unit 36, a reception unit 37, and a cache unit 38 by cooperation of the hardware resource and the data manager 34. According to the commands described in the data managers 14, 24, 34, respectively, the transmission units 16, 26, 36 transmit the data such that data synchronization is established between the information communication devices 10, 20, 30. According to the commands described in the data managers 14, 24, 34, respectively, the reception units 17, 27, 37 receive the data such that the data synchronization is established between the information communication devices 10, 20, 30. According to the commands described in the data managers 14, 24, 34, respectively, the cache units 18, 28, 38 temporarily store the data such that the data synchronization is established between the information communication devices 10, 20, 30.

When one of the three information communication devices 10, 20, 30 operates as a data transmission source, the remaining two information communication devices operate as data transmission destinations. Here, under a condition that the information communication device 10 operates as the data transmission source, the information communication device 20 operates as a first data transmission destination, and the information communication device 30 operates as a second data transmission destination, flow of the processing for synchronizing the data 15 will be described. For convenience of description, a communication link established between the information communication devices 10, 20 is referred to as a first communication link. A communication link established between the information communication devices 10, 30 is referred to as a second communication link. A communication link established between the information communication devices 20, 30 is referred to as a third communication link. The information communication device 10 transmits the data 15 to the information communication device 20 through the first communication link when the first communication link is established. When the vehicle on which the information communication device 10, which is the in-vehicle communication device, is mounted moves to a place where radio wave reception sensitivity is not good (for example, an indoor facility such as an underground parking lot), a situation where the first communication link between the information communication devices 10, 20 is temporarily lost may occur. Even in the situation as described above, when the distance between the information communication devices 10, 30 is within a range at which short-range wireless communication is possible (for example, when the information communication device 30 is carried by the occupant of the vehicle), the second communication link between the information communication devices 10, 30 can be established. The transmission unit 16 of the information communication device 10 reads the temporarily stored data 15 in the cache unit 18, transmits the data 15 to the information communication device 30, and notifies the information communication device 30 that the first communication link between the information communication devices 10, 20 is temporarily lost. The reception unit 37 of the information communication device 30 receives the data 15 from the information communication device 10 and temporarily stores the data 15 in the cache unit 38. Based on the notification from the information communication device 10, the information communication device 30 grasps that the first communication link between the information communication devices 10, 20 is temporarily lost. When the temporarily stored data 15 is present in the cache unit 38, the information communication device 30, taking a role of a data transmission source, tries to execute processing for transmitting the temporarily stored data 15 to the information communication device 20. For example, the information communication device 30 moves to a position where the third communication link between the information communication devices 20, 30 can be established (for example, the occupant carrying the information communication device 30 goes outdoors from the indoor facility such as the underground parking lot) and, accordingly, when the third communication link between the information communication devices 20, 30 is established, the transmission unit 36 of the information communication device 30, taking the role of the data transmission source, transmits the data 15 to the information communication device 20. The reception unit 27 of the information communication device 20 receives the data 15 from the information communication device 30 and temporarily stores the data 15 in the cache unit 28.

As described above, when the information communication devices 10, 20, 30 fall into a situation in which the communication link with any of information communication devices is temporarily lost, each of the information communication devices 10, 20, 30 notifies the other information communication devices with which the communication link is established that the above situation has occurred. The information communication device that has received the notification as described above, taking the role of the data transmission source, tries to transmit the data to the data transmission destination. The information communication device capable of the mobile communication, by changing the position of the information communication device itself, can establish the communication with the information communication device, which is the data transmission destination and taking the role of the data transmission source, and transmit the data to the data transmission destination.

A determination may be made whether the data received by the information communication device 20 from the information communication device 10 includes unreceived data, which is data that has not been received by the information communication device 30 from the information communication device 10, and when the unreceived data is present and the third communication link is established, the information communication device 20 may transmit the unreceived data to the information communication device 30. Accordingly, the data can be synchronized between the information communication devices 10, 20, 30. The information communication device 10 may not establish the second communication link when the first communication link is established. The information communication device 30 may not establish the third communication link when the second communication link is established.

When the information communication device 10 needs to synchronize the data 15, the information communication device 10 may establish the first or second communication link and when the information communication device 10 does not need to synchronize the data 15, the information communication device 10 may not establish the first or second communication link. When the information communication device 20 needs to synchronize the data 25, the information communication device 20 may establish the first or third communication link and when the information communication device 20 does not need to synchronize the data 25, the information communication device 20 may not establish the first or third communication link. When the information communication device 30 needs to synchronize the data 35, the information communication device 30 may establish the second or third communication link and when the information communication device 30 does not need to synchronize the data 35, the information communication device 30 may not establish the second or third communication link.

The information communication device 20 may operate as the data transmission source, the information communication device 30 may operate as a first data transmission destination, and the information communication device 10 may operate as the second data transmission destination. For example, in a situation where the third communication link between the information communication devices 20, 30 is temporarily lost, the information communication device 10, which is the second data transmission destination, receives the data 25 from the information communication device 20, which is the data transmission source. The information communication device 30 moves to a position where the second communication link between the information communication devices 10, 30 can be established, and accordingly, when the second communication link between the information communication devices 10, 30 is established, the information communication device 10, taking the role of the data transmission source, transmits the data 25 to the information communication device 30. Alternatively, the information communication device 30 may operate as the data transmission source, the information communication device 10 may operate as a first data transmission destination, and the information communication device 20 may operate as the second data transmission destination.

Figure 3:
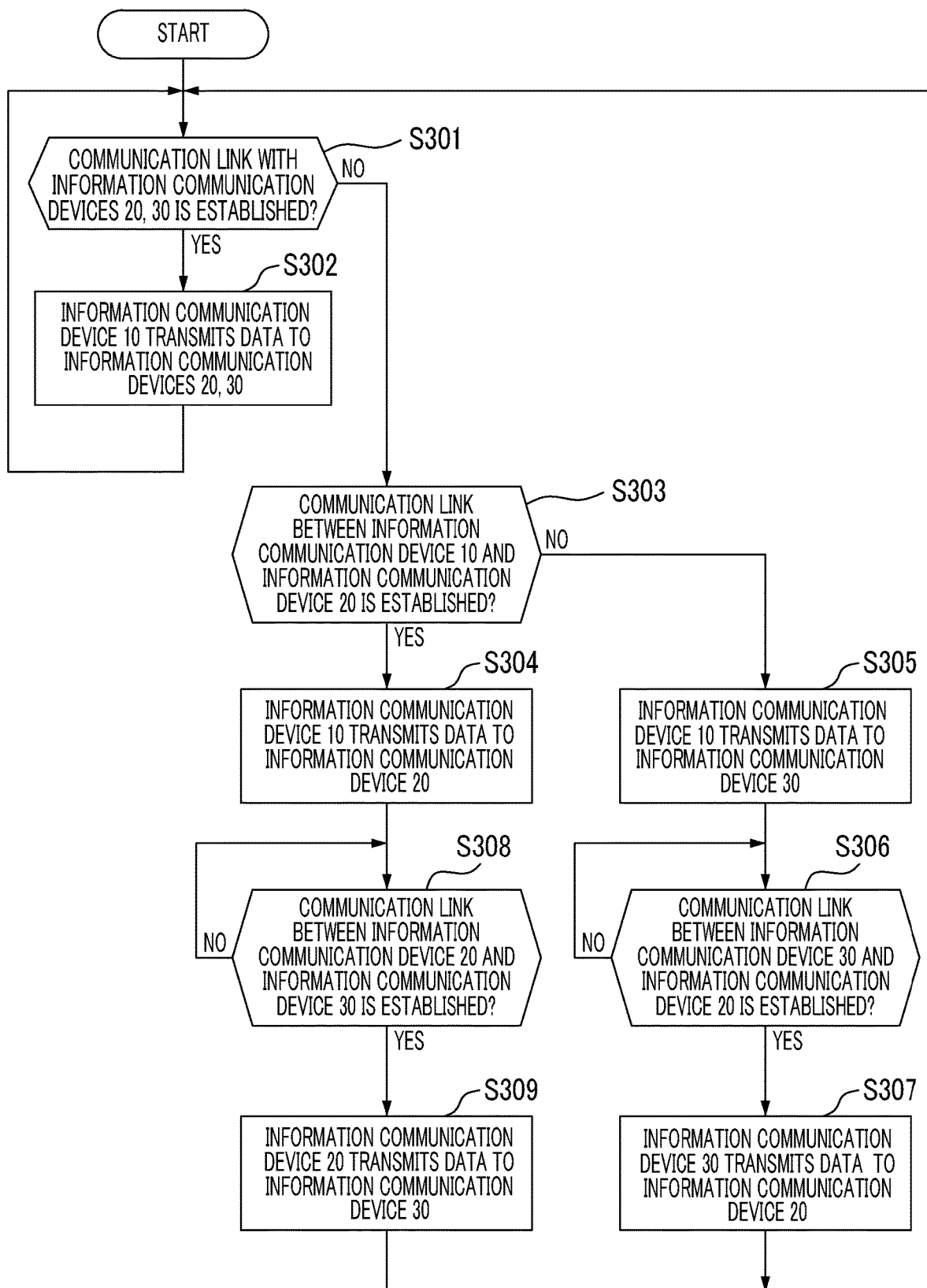
FIG. 3 is a flowchart illustrating flow of processing in a communication method according to the embodiment of the disclosure.

FIG. 3 is a flowchart illustrating flow of processing in a communication method according to the embodiment of the disclosure. Here, under a condition that the information communication device 10 operates as the data transmission source, the information communication device 20 operates as the first data transmission destination, and the information communication device 30 operates as the second data transmission destination, the flow of the processing for synchronizing the data 15 will be described.

In step S301, the information communication device 10, which is the data transmission source, determines whether or not the communication link with the information communication device 20 which is the first data transmission destination and the communication link with the information communication device 30, which is the second data transmission destination, are established.

In a case where a determination result in step S301 is positive, in step S302, the information communication device 10 transmits the data 15 to the information communication devices 20, 30, to synchronize the data 15 between the information communication devices 10, 20, 30.

In a case where the determination result in step S301 is negative, in step S303, the information communication device 10 determines whether or not the first communication link with the information communication device 20 is established.

In a case where the determination result in step S303 is positive, in step S304, the information communication device 10 transmits the data 15 to the information communication device 20, to synchronize the data 15 between the information communication devices 10, 20.

In a case where the determination result in step S303 is negative, in step S305, the information communication device 10 transmits the data 15 to the information communication device 30 to synchronize the data 15 between the information communication devices 10, 30. In a case where the determination result in step S303 is negative, a case may also be assumed that the second communication link between the information communication devices 10, 30 is temporarily lost; however, when the second communication link between the information communication devices 10, 30 is established, the processing in step S305 is performed.

In step S306, the information communication device 30, which is the second data transmission destination, determines whether or not the third communication link with the information communication device 20, which is the first data transmission destination, is established.

In a case where the determination result in step S306 is positive, in step S307, the information communication device 30 which is the second data transmission destination, taking the role of the data transmission source, transmits the data 15 to the information communication device 20, which is the first data transmission destination, to synchronize the data 15 between the information communication devices 20, 30. A case may also be assumed that the third communication link between the information communication devices 20, 30 is temporarily lost; however, when the third communication link between the information communication devices 20, 30 is established, the processing in step S307 is performed. Since the data 15 has already been synchronized between the information communication devices 10, 30 (step S305), the data 15 is synchronized between the information communication devices 10, 20, 30 through the processing in step S307.

In step S308, the information communication device 20, which is the first data transmission destination, determines whether or not the third communication link with the information communication device 30, which is the second data transmission destination, is established.

In a case where the determination result in step S308 is positive, in step S309, the information communication device 20, which is the first data transmission destination, taking the role of the data transmission source, transmits the data 15 to the information communication device 30, which is the second data transmission destination, to synchronize the data 15 between the information communication devices 20, 30. A case may also be assumed that the third communication link between the information communication devices 20, 30 is temporarily lost; however, when the third communication link between the information communication devices 20, 30 is established, the processing in step S309 is performed. Since the data 15 has already been synchronized between the information communication devices 10, 20 (step S304), the data 15 is synchronized between the information communication devices 10, 20, 30 through the processing in step S309.

As described above, with the communication system 100 of the embodiment, it is possible to realize a communication method useful for data synchronization.

The embodiment described above is intended to facilitate understanding of the disclosure and is not intended to limit the disclosure in any way. The disclosure can be changed or improved without departing from its spirit and the disclosure also includes its equivalents. That is, those in which design modifications are appropriately made by those skilled in the art to the embodiment are also included in the scope of the disclosure as long as they have the features of the disclosure. The elements included in the embodiment can be combined as far as technically possible and combinations thereof are also included in the scope of the disclosure as long as they include the features of the disclosure.

What is claimed is:

1. A communication method in which an in-vehicle communication device transmits data to a server, the communication method comprising:
    transmitting the data from the in-vehicle communication device to the server through a first communication link when the first communication link between the in-vehicle communication device and the server is established;
    transmitting the data from the in-vehicle communication device to a relay device different from the server through a second communication link different from the first communication link when the first communication link is not established;
    notifying the relay device through the second communication link that the first communication link is lost when the first communication link is not established;
    temporarily storing the data received from the in-vehicle communication device in the relay device when a third communication link between the relay device and the server is not established; and
    transmitting the temporarily stored data from the relay device to the server through the third communication link when the third communication link is established and the temporarily stored data is present in the relay device.

2. The communication method according to claim 1, wherein the relay device is a mobile communication terminal that performs mobile communication with the server.

3. The communication method according to claim 1, further comprising:
    determining whether the data received by the server from the in-vehicle communication device includes data that has not been received by the relay device from the in-vehicle communication device; and
    transmitting the data that has not been received by the relay device, from the server to the relay device when the data that has not been received by the relay device is present and the third communication link is established.

4. An in-vehicle communication device that transmits data to a server, the in-vehicle communication device comprising a transmission unit configured to
    transmit the data to the server through a first communication link when the first communication link between the in-vehicle communication device and the server is established,
    transmit the data to a relay device different from the server through a second communication link different from the first communication link when the first communication link is not established, and
    notify the relay device through the second communication link that the first communication link is lost when the first communication link is not established;
    wherein the relay device is configured to
        temporarily store the data received from the in-vehicle communication device when a third communication link between the relay device and the server is not established, and
        transmit the temporarily stored data to the server through the third communication link when the third communication link is established and the temporarily stored data is present in the relay device.

5. A non-transitory computer-readable medium storing a program causing a computer to execute a process, the process comprising:
    transmitting data from an in-vehicle communication device to a server through a first communication link when the first communication link between the in-vehicle communication device and the server is established;
    transmitting the data from the in-vehicle communication device to a relay device different from the server through a second communication link different from the first communication link when the first communication link is not established;
    notifying the relay device through the second communication link that the first communication link is lost when the first communication link is not established;

temporarily storing, by the relay device, the data received from the in-vehicle communication device when a third communication link between the relay device and the server is not established; and transmitting, by the relay device, the temporarily stored data to the server through the third communication link when the third communication link is established and the temporarily stored data is present in the relay device.

6. An in-vehicle communication system comprising:

an in-vehicle communication device;

a server configured to communicate with the in-vehicle communication device; and a relay device configured to communicate with the in-vehicle communication device and the server, wherein:

the in-vehicle communication device is configured to transmit data to the server through a first communication link when the first communication link between the in-vehicle communication device and the server is established, transmit the data to the relay device different from the server through a second communication link different from the first communication link when the first communication link is not established; and notify the relay device through the second communication link that the first communication link is lost when the first communication link is not established; and the relay device is configured to temporarily store the data received from the in-vehicle communication device when a third communication link between the relay device and the server is not established, and transmit the temporarily stored data to the server through the third communication link when the third communication link is established and the temporarily stored data is present in the relay device.

* * * * *